Jan. 29, 1963 V. C. ORENDUFF 3,075,575
TIRE GROOVING APPARATUS
Filed Sept. 6, 1961 6 Sheets-Sheet 1
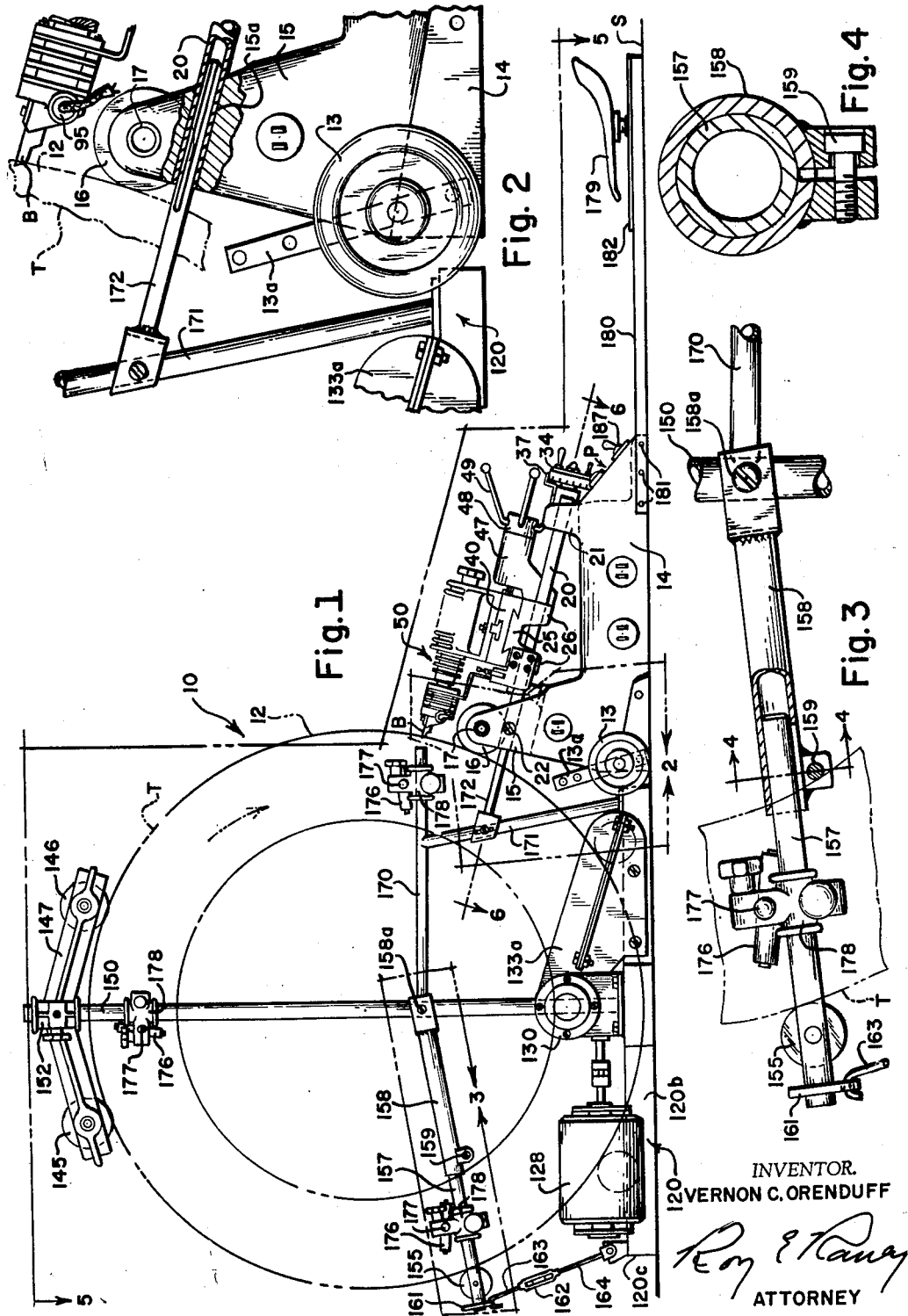
INVENTOR.
VERNON C. ORENDUFF
ATTORNEY

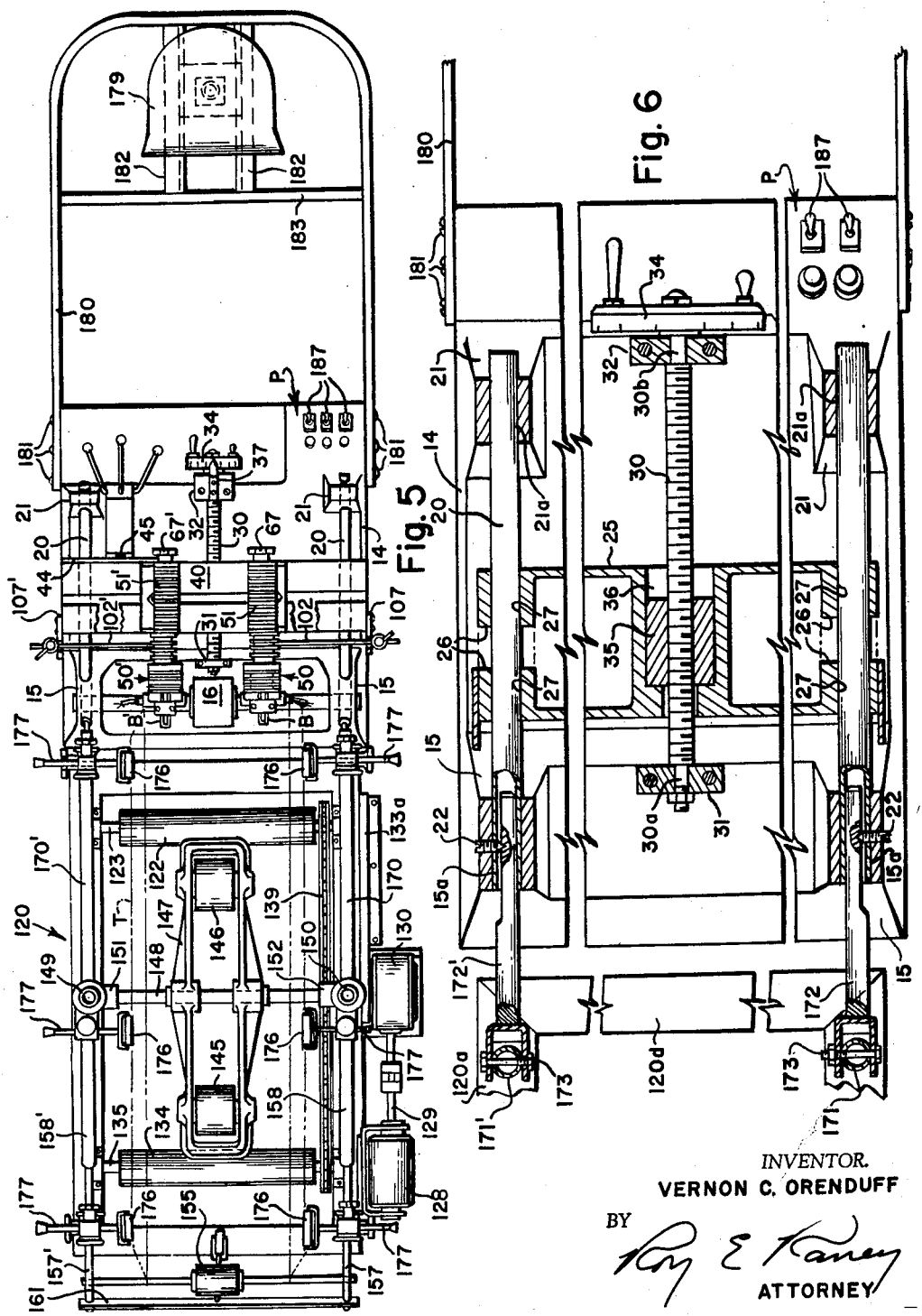

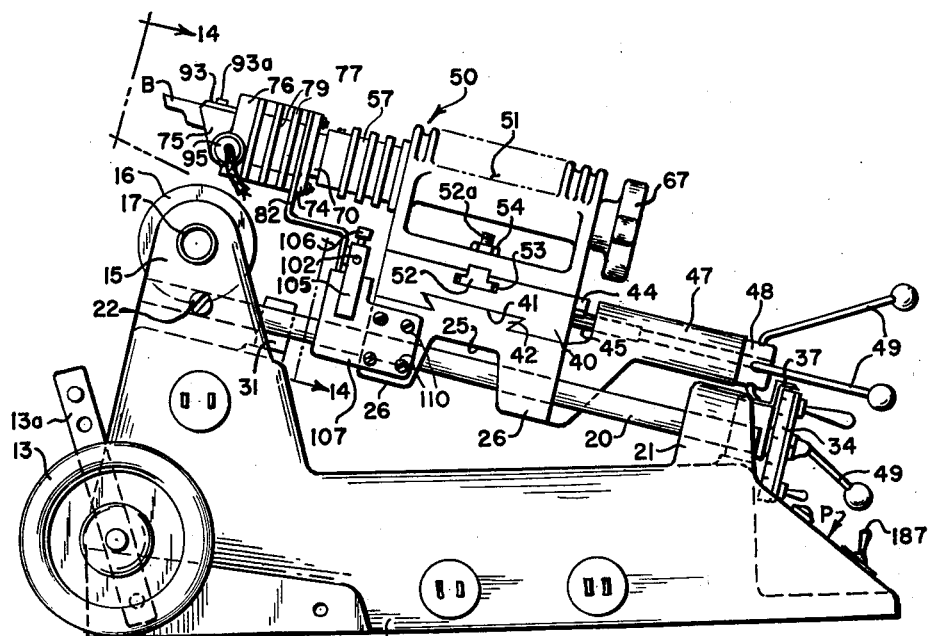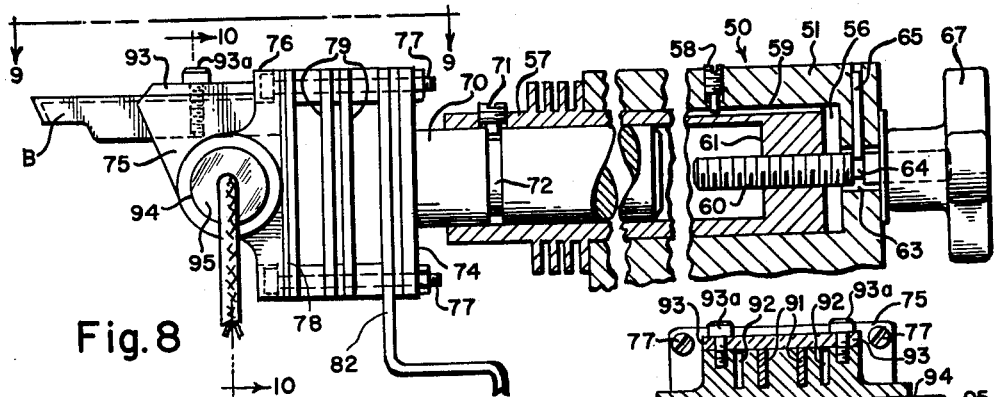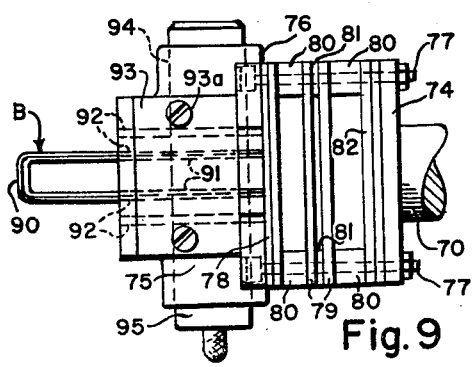

INVENTOR.
VERNON C. ORENDUFF

BY

ATTORNEY

Jan. 29, 1963  V. C. ORENDUFF  3,075,575
TIRE GROOVING APPARATUS
Filed Sept. 6, 1961  6 Sheets-Sheet 5

INVENTOR.
VERNON C. ORENDUFF
BY
ATTORNEY

Jan. 29, 1963   V. C. ORENDUFF   3,075,575
TIRE GROOVING APPARATUS
Filed Sept. 6, 1961   6 Sheets-Sheet 6

INVENTOR.
VERNON C. ORENDUFF
BY
ATTORNEY ited States Patent Office 3,075,575
Patented Jan. 29, 1963

3,075,575
TIRE GROOVING APPARATUS
Vernon C. Orenduff, 16 Marina Terrace, Treasure Island, St. Petersburg, Fla.
Filed Sept. 6, 1961, Ser. No. 136,351
6 Claims. (Cl. 157—13)

This invention relates to improvements in apparatus for grooving the tread portions of rubber tires to improve their road holding characteristics. More particularly, the invention is directed to improved tire grooving apparatus for cutting grooves in a desired pattern whether the tire be on or off a vehicle.

It is one important object of the present invention to provide an improved tire grooving apparatus comprising drive means for rotating a tire about its normal axis of rotation past a pair of tire grooving tool holding assemblies, each of which comprises a tool holder adapted to present one or more heated cutting blades, and which assemblies are mounted on a carriage supported cross slide for movement transversely with respect to the tire tread surface as the tire rotates so that the cutting blades may form a desired pattern, of zig-zag or sinuous grooves for example, the apparatus including improved means for turning or rocking each tool holder and blade in one direction or the other about an axis normal to the tread in accordance with transverse movement of the tool holder to one side or the other of the center line of the pattern to be made so that cutter blades are each maintained at an advantageous aspect with respect to the movement of the tire and direction of cut.

Another object of this invention is the provision of improved tool holding assemblies for holding and heating tire grooving tools or cutters to a desired temperature on the order of 550° F. while permitting the above mentioned movements, the assemblies each comprising a block having a bore receiving a socket member which can be projected or retracted toward or away from the tire to be grooved and having a pivot pin rotatably received in the socket member, the pivot pin having a heated tool holder mounted thereon with heat barrier means between the holder and the pivot pin, and wherein the holder comprises a clamp member for one or more U-shaped cutter blades and has a bore receiving an electrical resistance element extending transversely of the legs of the cutter blades.

As another object the invention aims to provide particularly simple and effective rocking means for accomplishing the synchronized turning or rocking action of the tool holders and blades about the axes of their respective pivot pins as the cross slide moves with respect to its supporting carriage from one side to the other of the groove pattern center, the rocking means for each tool holder being operative independently of the other and comprising a link having one end pivotally connected to the cross slide supporting carriage, and the other end rigidly but adjustably secured at right angles to one end of a tie rod, the tie rod being pivotally connected at its other end to an arm extending from the tool holder and normal to the axis of the pivot pin whereby movement of the cross slide and tool holders with respect to the carriage will cause rocking movement of the tool holders about their respective pivot pins. The adjustable connections between the links and the tie rods permit the tool holders to be adjustably spaced or, if desired, one tool holder may be disconnected from the cross slide or moved out of operative position while the other tool holder may be used to cut a single groove pattern.

Other objects and advantages of the present invention will become apparent from the following detailed description of a presently preferred embodiment thereof taken in conjunction with the accompanying sheets of drawings forming a part of this specification, and in which:

FIG. 1 is an elevational view of a tire grooving apparatus embodying the present invention, with a tire to be grooved shown in phantom;

FIG. 2 is a fragmentary view of a portion of the apparatus of FIG. 1 on an enlarged scale;

FIG. 3 is another enlarged fragmentary view;

FIG. 4 is an enlarged sectional view taken along line 4—4 of FIG. 3;

FIG. 5 is a plan view of the apparatus of FIG. 1;

FIG. 6 is an enlarged sectional view taken along line 6—6 of FIG. 1;

FIG. 7 is an enlarged elevational view of a portion of the apparatus;

FIG. 8 is an enlarged view, partly in section of a tool holding assembly forming part of the apparatus;

FIG. 9 is a plan view taken along line 9—9 of FIG. 8;

FIG. 10 is a sectional view taken along line 10—10 of FIG. 8;

Figure 11:
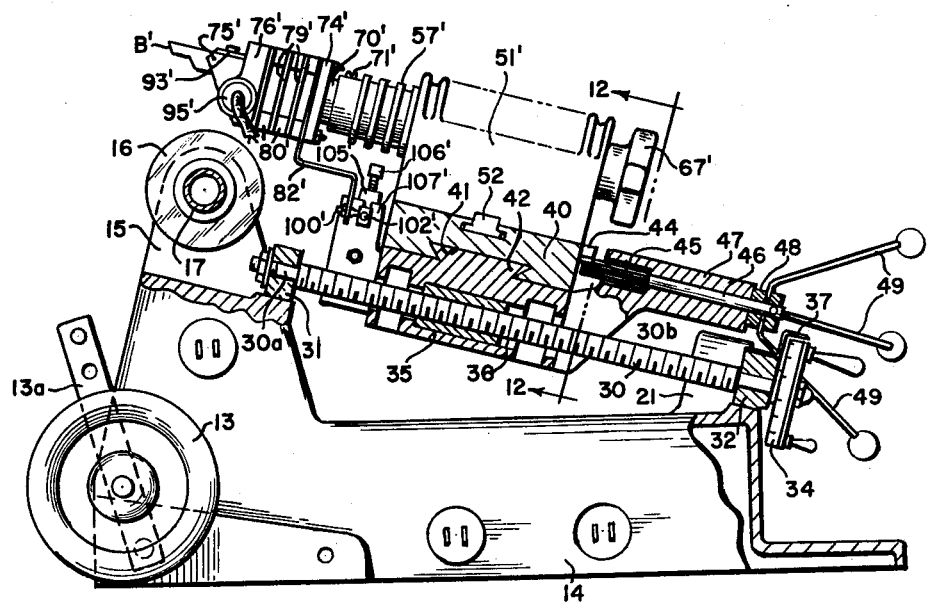
FIG. 11 is a view, partly in section, of a portion of the apparatus.

In the form of the invention illustrated in the drawings and described hereinafter there is provided a tire grooving apparatus, generally indicated at 10, which is adapted to cut a pattern of grooves in a tire carcass T which is illustrated in phantom. Tire carcass T, referred to hereafter simply as tire T although it contains no inner tube and is not mounted on a wheel rim, has a tread surface 12 in which grooves are desired to be formed to improve forward and/or lateral traction between the tire and the road surface. Grooves having a sinuous or zig zag pattern are generally considered to be the most effective for this purpose and the apparatus 10 is particularly effective in forming such grooves, although it is also capable of forming a series of diagonal grooves, simple transverse grooves, and circumferential grooves as may be preferred under various circumstances.

Tire grooving apparatus 10 comprises a bed or frame 14, preferably formed as a metal casting having a flat base surface adapted to rest upon a floor surface S. A pair of retractable wheels 13 are mounted on swing arms 13a, pivoted to frame 14, and serve to aid in moving the apparatus when necessary. Frame 14 has spaced upright members 15, between the upper ends of which is disposed a gauge roller 16 having axle stubs or trunnions 17 suitably journaled in the upright members 15. Each of the upright members 15 has a bore 15a receiving one of a pair of parallel, carriage supporting, tubular ways or shafts 20 which have their other ends received in bores 21a of additional spaced upright members 21 of frame 14.

Upright members 21 are shorter than members 15 so as to provide an upward slope to parallel shafts 20 in a direction toward the tire T when the latter has its tread portions 12 in engagement with gauge roll 16 as shown in FIGS. 1 and 2. Shafts 20 are secured in bores 15a by set screws 22 extending through threaded openings in the upright members 15 as shown in FIG. 6.

A carriage 25 is slidably mounted on shafts 20 for movement therealong toward and away from tire T, the carriage comprising a casting provided with bosses 26 having aligned bores 27 therethrough in which the shafts are slidably received. A carriage feed screw 30 has bearing portions 30a and 30b formed at its opposite ends and rotatably journaled in bearing blocks 31 and 32, respectively, which are mounted on frame 14 between upright members 15 and 21. A graduated hand wheel 34 is secured to end 30b of screw 30 for effecting manual rotation thereof. An internally threaded nut 35 is held by a press fit in a counterbore 36 formed in the center portion of carriage 25, and is threadedly engaged on screw 30 so that rotation of hand wheel 34 and screw 30 will effect movement of carriage 24 in one direction or the other along shafts 20. The graduations on hand wheel 34 cooperate with a pointer or index 37 fixed to bearing block 32 and are calibrated to indicate movement of carriage 25 toward or away from tire T in convenient fractions of an inch.

Figure 12:
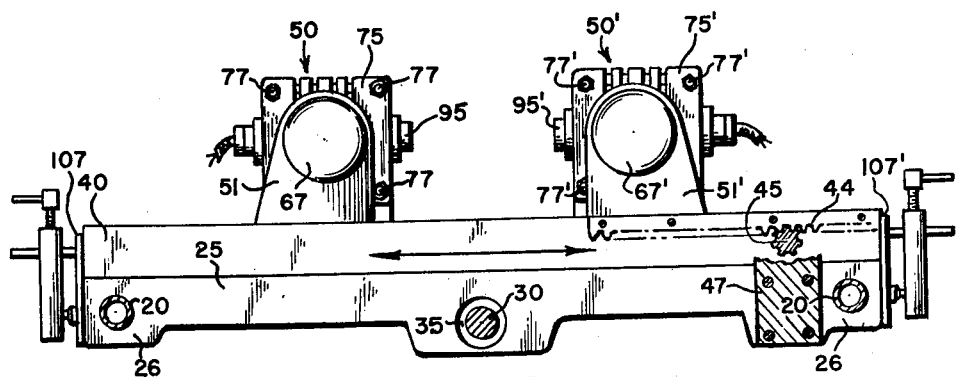
FIG. 12 is a sectional view taken along line 12—12 of FIG. 11.

Mounted on top of carriage 25 is a cross slide 40 having a transverse dove tail slot 41 engaged by a complementary dove tail element 42 on carriage 25 and forming therebetween a sliding connection permitting movement of cross slide 40 transverse to the extent of shafts 20. Cross slide 40 is provided with a transversely extending gear rack 44 which is engaged by a pinion 45, best shown in FIGS. 11 and 12. Pinion 45 is mounted for rotation with a shaft 46 journaled in a shaft bearing member 47 mounted on carriage 25. A hub 48 is secured to shaft 46 at the end opposite pinions 45 and has a plurality of shaft rotating handles 49 projecting therefrom. It will be recognized that rotation of shaft 46 and pinion 45 by movement of handles 49 will cause rack 44 and cross slide 40 to be moved transversely in one direction or the other.

A pair of tire grooving tool holding assemblies, generally indicated at 50 and 50' are mounted on cross slide 40 for movement therewith. The assemblies 50 and 50' are identical so only assembly 50 and associated parts will be described in detail, the corresponding parts of assembly 50' being given corresponding reference numerals with a prime mark. Assembly 50 comprises a mounting block 51 secured to cross slide 40 by a key shaped clamping element 52 disposed in a complementary slot 53 in the cross slide and having a threaded portion 52a on which a nut 54 is provided for releasably clamping block 51 to the cross slide.

As is best illustrated in FIG. 8, block 51 has a bore 56 extending parallel to shafts 20 and slidably receiving a tubular socket member 57. Socket member 57 is prevented from rotation in a bore 56 by cooperation of a screw 58 extending from block 51 into a groove 59 formed in the socket member. Socket member 57 is adapted to be extended or retracted with respect to block 51 by means including a screw 60 threadedly engaged in an opening in an end wall 61 of socket member 57, and extending through an opening 63 in block 51. Screw 60 has an annular groove 64 engaged by a pin 65 to prevent axial movement of the screw with respect to bore 56 when turned by an adjusting knob 67 secured thereon. It will be recognized that rotation of knob 67 will advance or retract socket member 52 in bore 56.

A cylindrical pivot pin 70 is rotatably retained in socket member 57 by a screw 71 cooperating with a groove 72 in the pivot pin. Pivot pin 70 has a rectangular plate or head 74 to which is secured a cutting tool holder 75. A cutting tool in the form of a U-shaped blade B, later described more fully, is clamped in the tool holder 75. Tool holder 75, best illustrated in FIGS. 8 and 9 and 10 has a rectangular flange or base 76 and is separated from pivot head 74 by heat barrier means clamped between flange 76 and head 74 by bolts 77. The heat barrier means comprises a layer of glass fiber material 78, aluminum plates 79 separated by spacers 80 and 81 which surround bolts 77 and a tool holder rocking lever 82. Lever 82 forms parts of a mechanism, later described in detail, for rotating or rocking tool holders 75 and 75' to cause blades B held thereby to be moved in a direction to provide the most advantageous cutting aspect with respect to the tire T.

Figure 20:
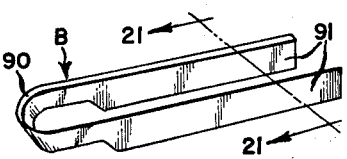
FIG. 20 is a perspective view of a groove cutting blade.

Each blade B, B', best shown in FIG. 20, is in the form of a U-shaped piece of steel sharpened to a cutting edge 90 at the top edge of the blade, and having leg portions 91 received in slots 92 formed in tool holder 75 and secured therein by a plate 93 overlying slots 92 and removably fixed to a holder 75 by screws 93a. The holder 75 is provided with additional slots 92 which are unevenly spaced so that two blades B may be used simultaneously or, blades of different widths may be used by utilizing various combinations of the slots 92. It will be apparent that the rubber which is removed to form the groove passes between the legs 91 as a cut is made.

Tool holder 75 has a horizontal bore 94 which extends transversely of the slots 92. A cylindrical, electrical resistance type heating element 95 is disposed in bore 94 in crossing relation to the legs 91 so as to maintain the blade B at a temperature which will facilitate cutting of rubber. In the present instance a heating element 95 having a power consumption of 250 watts has been found to maintain the blade B at a temperature on the order of 550° F. during cutting.

The tool holder rocking mechanism of which levers 82 and 82' form a part, is adapted to provide angular deflections of the blades B and B' in one direction whenever cross slide 40 is to the right of a center position with respect to a pattern being cut in a tire, and to provide angular deflections in the opposite direction whenever cross slide 40 is to the left of its center position. To this end, lever 82 is provided with a ball member 100 which is received in a socket member 101 provided at one end of a tie rod 102. The other end of tie rod 102 is releasably clamped in an opening 104 of a link 105 by a set screw 106. Link 105 is in turn universally connected to a bracket 107 by a ball member 108 connected to the bracket and received in a socket in the link. Bracket 107 is secured by screws 110 to one forward boss 26 of carriage 25 for movement therewith. A similar tie rod 102' and link 105' are connected between arm 82' and a bracket 107' on carriage 25.

Figure 14:
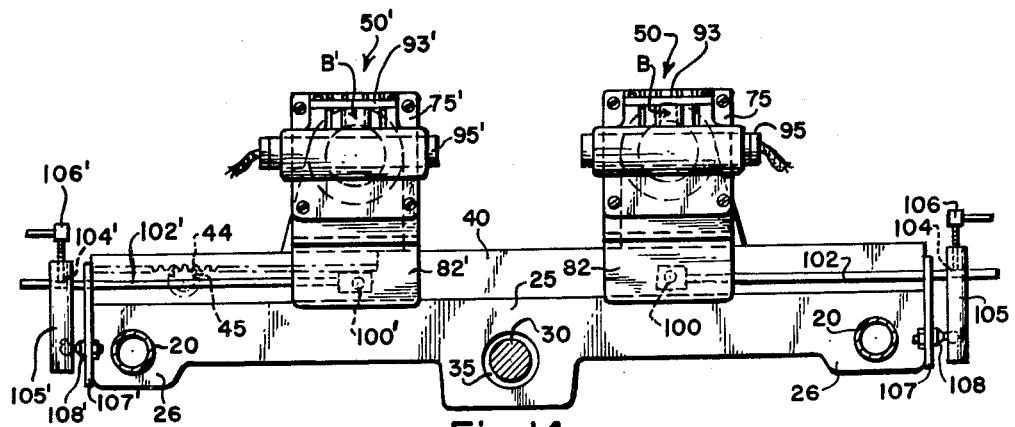
FIG. 14 is a view illustrating center positions of the tool holders.
Figure 15:
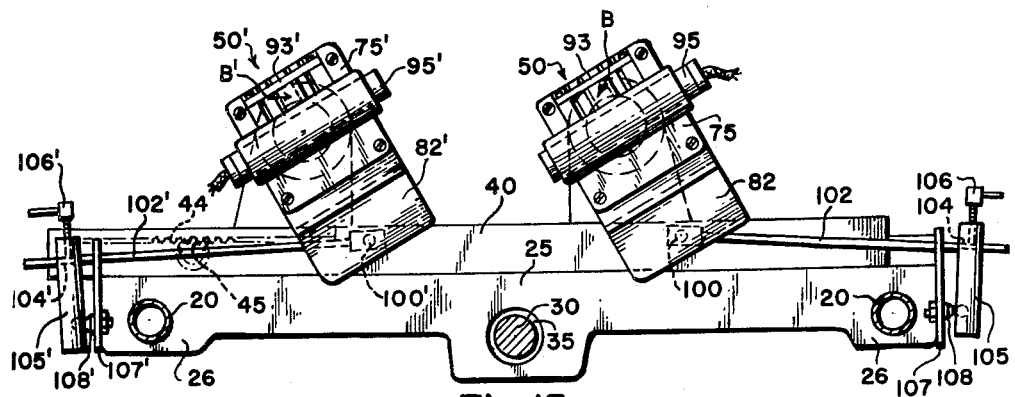
FIGS. 15 and 16 are views similar to FIG. 14 showing dieffrent positions of the tool holders.
Figure 16:
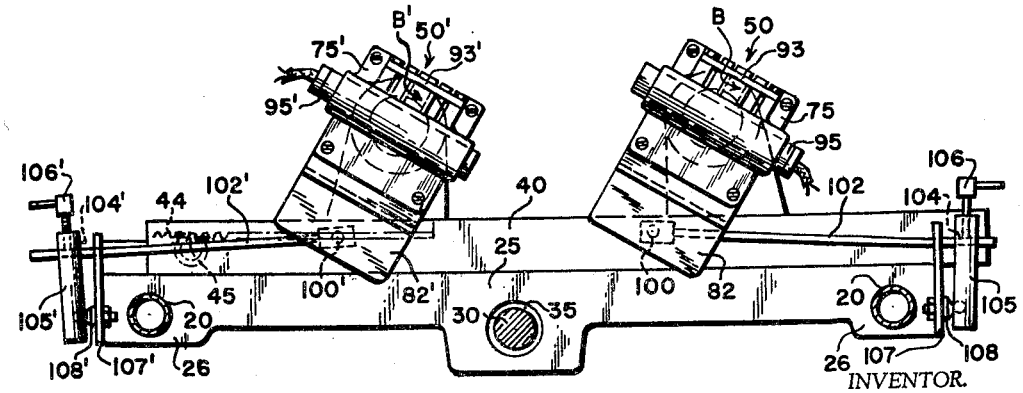

Referring to FIGS. 14, the cross slide 40 is illustrated in its center position, and levers 82 and 82', and blade holders 75 and 75' lie in vertical planes. When arms 49 are moved to cause pinion 45 to shift cross slide 40 to the left as shown in FIG. 15, however, it will be seen that link 105 and rod 102 act on lever 82 to cause rotation of pivot pin 70 and blade holder 75 so as to cause counter-clockwise angular deflection of blade B as the blade moves transversely with the cross slide 40. When cross slide 40 is moved to the right of its center position as in FIG. 16, link 105 and rod 102 act on lever 82 to cause clockwise deflection of blade B as it is carried to the right by the cross slide. In a like manner link 105' and rod 102' act on lever 82' to cause rocking of tool holder 75' to maintain blade B' always in parallel relation to blade B.

Figure 18:
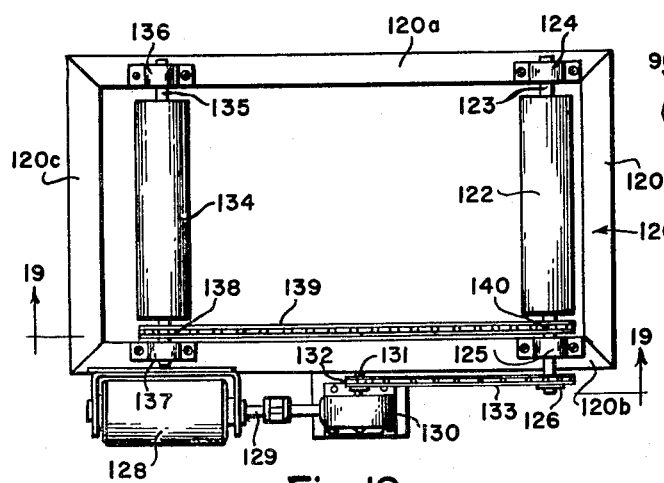
FIG. 18 is a sectional view taken along line 18—18 of FIG. 17.
Figure 21:
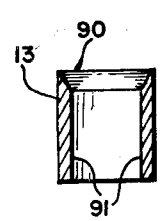
FIG. 21 is a sectional view taken along line 21—21 of FIG. 20.
Figure 19:
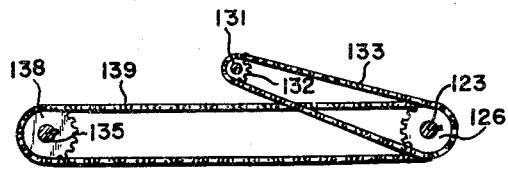
FIG. 19 is a fragmentary view illustrating a portion of the tire rotating mechanism.

The tire T is adapted to be rotated in a clockwise direction, as viewed in the drawings, so that the tread 12 passes downwardly with respect to cutter blades B and B' which are adapted to cut parallel grooves in the tread. The means for supporting and rotating tire T is best shown in FIG. 18 and comprises a rectangular frame 120 having side rails 120a and 120b joined by end rails 120c and 120d. A drive roller 122, having an axle shaft 123, is mounted on frame 120 with axle shaft 123 journaled in bearing blocks 124 and 125 mounted on side rails 120a and 120b respectively. Shaft 123 extends beyond rail 120b and has a sprocket 126 forming part of drive means for roller 122. This drive means includes an electric motor 128 mounted on side rail 120b and coupled by suitable shafting 129 to a reduction gearing unit 130 having an output shaft 131. A sprocket 132 is secured to shaft 131 for rotation thereby and an endless chain 133 extends about sprockets 132 and 126 to effect rotation of roller 122. Sprockets 126, 132 and chain 133 are advantageously enclosed in a suitable chain guard housing 133a.

An additional roller 134 extends in spaced, parallel relation to roller 122 and has a shaft 135 rotatably journaled in bearing blocks 136 and 137 respectively. A sprocket 138 is secured to shaft 135 and is engaged by an endless chain 139 extending about a sprocket 140 secured to shaft 123. Chain 139 causes roller 134 to be rotated in the same direction and at the same speed as roller 122. Rollers 122 and 134, which support tire T, drive the tire through frictional engagement therewith at a speed which causes the tread thereof to pass blades B and B' at a rate on the order of one inch per second.

Tire T is held tightly against rollers 122 and 134 by a pair of rollers 145 and 146 carried at opposite ends of a rocker arm 147. Rocker arm 147 is pivotally supported on a cross shaft 148 between upright members 149 and 150 extending upwardly from frame 120. Cross shaft 148 is connected to uprights 149 and 150 by suitable fittings 151 and 152 which are releasably clamped to the uprights and permit raising or lowering of rocker arm 147 for accommodation of different sized tires in the apparatus.

In order to assure positive engagement of tire tread 12 with gauge roll 16, a pressure roller 155 is supported between a pair of telescopically adjustable swing arms, one of which is shown best in FIG. 3 and comprises a shaft 157 received in a tubular member 158 which is pivoted as at 158a to upright 150. Tubular member 158 is preferably slotted adjacent the open end thereof and includes screw means 159 (FIGS. 3 and 4) for causing shaft 157 to be releasably clamped by the tubular member with roller 155 engaging tire T at a position somewhat below the horizontal center line of the tire. A similar swing arm, comprising elements 157' and 158' corresponding to shaft 157 and tubular member 158, is pivotally connected to upright 149 and supports one end of roller 155. The ends of shaft member 157 and 157' extend beyond roller 155 and are joined by a cross member 161. A turnbuckle 162, which includes stiff rod members 163 and 164, is connected to cross member 161 and frame member 120c respectively, and serves to forcefully raise roller 155 against tire T to force the latter into positive engagement with gauge roller 16.

Uprights 149 and 150 are braced by strut means including horizontal bars 170 and 170' rigidly secured at one end to the uprights and supported at their other ends by bars 171 and 171' rigidly connected between the bars 170, 171' and frame rails 120a and 120b, respectively. A pair of tie rods 172 and 172' are pivotally connected at one end to strut members 171 and 171' as at 173, and have their other ends slidably received in the open ends of carriage supporting tubular shafts 20 in which they are adjustably secured by set screws 22 as shown in FIG. 6. Tie rods 172 and 172' serve to adjustably tie the tire supporting and rotating portion of the apparatus on frame 120 to the tire grooving portion of the apparatus supported on frame 14, and overcome any likelihood of relative movement between the frames and therefore assure proper engagement of tire tread 12 with gauge roller 16.

A plurality of adjustably positioned guide rollers 176 are supported from shafts 157, 170, and uprights 149 and 150, and bear against the side wall portions of tire T to provide lateral support therefor. Each roller 176 is supported at the end of an arm 177 extending through an adjustable clamp 178 which is, in turn, adjustably positioned on its respective supporting shaft or upright. Each clamp 178, therefore, permits alignment of the roller 176 supported thereby with the side walls of tires of varying sizes.

A seat 179 for the operator of apparatus 10 is attached to frame 14 by a U-shaped band of metal 180 which is secured at the end portions thereof by screws 181 to the portion of frame 14 which is remote from the tire to be grooved. A pair of seat supporting parallel rails, 182 extend between the yoke portion of band 180 and a cross member 183, and serve to provide adjustable support for seat 179. Seat 179 may be shifted along rails 182 toward or away from frame 14 as desired by the operator. The portion of frame 14 facing seat 179, is sloped to form a control panel P on which are mounted a plurality of switches 187 for controlling the energization of electric motor 124, and heating elements 95 and 95'. It will be recognized that all of the controls, including handles 49, knobs 67 and 67', hand wheel 34, and switches 187, are all conveniently located for use by the operator of the apparatus.

The operation of apparatus 10 in grooving the tire T will now be described. With rocker arm 147 removed from uprights 149 and 150, a tire T is rolled onto rollers 122 and 134 in a vertical position as shown. Rocker arm 147 is then engaged on the uprights and clamped thereon in downwardly pressing relation to the tire. Frame 14 is then moved toward frame 120 to bring gauge roll 16 into firm contact with the tire tread 12 and tie rods 172, 172' are secured within shafts 20 by set screws 22. Turn buckle 162 is then rotated as necessary to cause roller 155 to apply pressure to tire T in a direction toward gauge roll 16. Thereafter, side wall engaging rollers 176 are adjusted and clamped to stabilize the tire in a vertical plane.

Assuming that only a single groove is to be made, knob 67 is turned to move socket member 57 out of block 51 so that blade B extends beyond blade B' a distance exceeding the depth of the groove to be made. Hand wheel 34 is then rotated to cause screw 30 to advance carriage 25 toward the tire T until blade B almost engages the tread thereof. Of course, heating element 95 will have been energized for a time period sufficient to raise the temperature of blade B to its cutting temperature. Motor 124 is then energized causing rollers 122 and 134 to rotate tire T in a sense to bring tread 12 thereof downwardly past blade B. Control arms 49 are then rotated to move cross slide 40 to bring blade B to its center position with respect to the pattern which will be cut, for example, a zig zag pattern. Hand screw 106 is then loosened and rod 102 shifted with respect to link 105 to bring tool holder 75 and blade B to a position directly facing the rotation of tire T, after which hand screw 106 is tightened to clamp rod 102. Hand wheel 34 is then turned to advance cutter blade B into the tire beginning the cutting of the groove, and at the same time handles 49 are manipulated to shift cross slide 40 and cutter blade B from side to side so that the blade B describes the desired pattern in the tread of the tire. It will be recalled that as cross slide 40 is moved to one side or the other of the position in which blade B is at the center of the pattern, link 105, rod 102 and lever 82 will cause tool holder 75 to rotate about pivot pin 70 thereby causing angular deflection of blade B in one direction or the other to maintain the desired aspect thereof with respect to the tire.

If it is desired that two parallel grooves be cut simultaneously, knob 67' is rotated to advance socket member 57 to bring blade B' into cutting engagement with the tire. Because blades B and B' can be advanced independently by knobs 67 and 67', grooves of even depth may be formed simultaneously on any portion of the tread even though the tire has a crowned tread surface 12.

Figure 13:
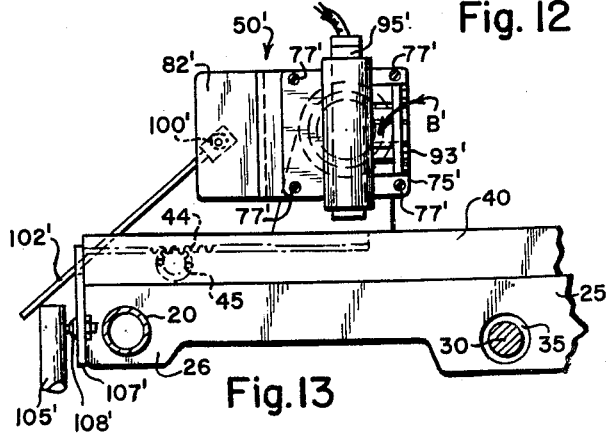
FIG. 13 is a fragmentary view illustrating the horizontal cutting position of one tool holder assembly.

Occasionally, it is desirable to provide a series of transverse grooves in a tire tread, and this is readily accomplished by disconnecting a tie rod, such as 102' in FIG. 13, from its link 105' and rotating blade holder 75' to a horizontal position. The blade holder 75' is secured in that position by causing set screw 71' to seat in groove 72. With the blade holder so positioned, a series of transverse grooves may be readily formed.

Figure 17:
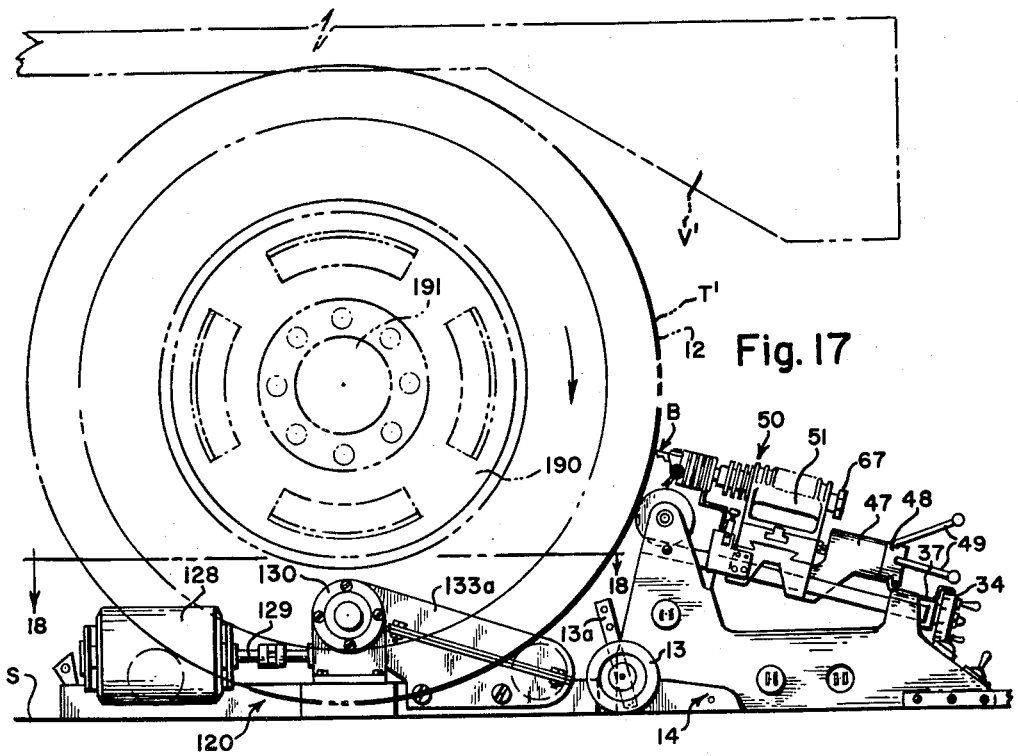
FIG. 17 is an elevational view of the apparatus showing the use of the same in grooving a tire mounted on a vehicle.

Referring now to FIG. 17, the apparatus 10 is shown in position for grooving a tire T' which is mounted on a rim 190 which is secured to the axle 191 of a truck or other vehicle V. Tire T' rests on, and is rotated by rollers 122 and 134. In this instance, however, the rim and axle maintain the tire vertical, while the weight of vehicle V maintains pressure between the tire and rollers 122 and 134. Accordingly the guide rollers 176, the pressing rollers 145 and 146, and their supporting structure has been removed. In addition, the weight of the vehicle precludes any likelihood of frame 120 moving tire T' out of engagement with guage roll 16, and hence tie rods 172 and roller 155 have been removed.

In some instances, as in the case of light weight, unmounted tires, it is desirable to reverse the direction of rotation of the tire and place blades B and B' with their cutting edges facing downwardly. This arrangement utilizes the cutting pressure between blade B and the tire T to urge the latter into better engagement with drive rolls 122 and 134.

From the foregoing detailed description of a preferred form of tire grooving apparatus embodying my invention, it will be appreciated that there has been provided thereby a particularly versatile and effective apparatus which is adapted to cut one or more grooves in a desired pattern simultaneously, which positions the cutter blades in accordance with movement of the blade holding assemblies to provide an advantageous cutting aspect of the blades to the tire, and which is simple and reliable in operation.

Although my invention has been described in considerable detail and with reference to a specific form of the tire grooving apparatus, it will be understood that the invention is not limited thereto, but rather the invention includes all those changes, modifications, adaptations, and uses as are embraced by the scope of the claims hereof.

Having thus described my invention, I claim:

1. A tire grooving apparatus comprising a frame, a grooving tool holder, support means for mounting said tool holder on said frame and for effecting relative movement between said tool holder and the tread portion of a tire, said tool holder comprising a body of heat conducting metal having a plurality of slots for receiving the leg portions of a grooving tool in the form of a U-shaped cutting blade, said holder having a bore extending transverse to said slots, an electrical resistance heating element disposed in said bore, and heat barrier means disposed between said body and said support means, said heat barrier means comprising a plurality of metal plates separated from one another by spacer means.

2. In a tire grooving apparatus having drive roll means for supporting and rotating a tire about its rotational axis, a frame, a carriage mounted on said frame for movement toward and away from the tread portion of said tire, means between said frame and carriage for effecting said movement, a cross slide mounted on said carriage for movement transversely of the tread of said tire, means on said cross slide and carriage for effecting said movement of the cross slide, a grooving tool holding assembly mounted on said cross slide and including a block adjustably clamped on said cross slide, a tool holder, a grooving tool secured in said holder and having a tire cutting edge, means mounting said tool holder on said block for rotation about an axis extending normal to said tire tread, an arm extending from said holder normal to the last mentioned axis, a link pivotally connected to said carriage, and a tie rod having one end adjustably but rigidly connected at right angles to said link and having its other end pivotally connected to said arm of said cross slide to one side or the other of a center position with respect to a tread pattern to be cut in said tire will cause rotation of said holder and deflection of said cutting edge of said tool in the direction of said displacement.

3. In a tire grooving apparatus as defined in claim 3, a second tool holding assembly adjustably mounted on said cross slide, and comprising a second block, a second tool holder, a second grooving tool secured in said second holder and having a tire cutting edge, means mounting said second tool holder on said second block for rotation about an axis extending normal to said tire tread, a second arm extending from said second holder normal to the last mentioned axis, a second link pivotally connected to said carriage and a second tie rod having one end adjustably but rigidly connected at right angles to said second link and having its other end pivotally connected to said second arm whereby upon displacement of said cross slide said second holder is rotated in synchronism with said first holder and the cutting edge of said second tool is deflected in the direction of said displacement.

4. In a tire grooving apparatus having drive roll means for supporting and rotating a tire about its rotational axis, a frame, a carriage mounted on said frame for movement toward and away from the tread portion of said tire, a drive screw between said frame and carriage for effecting said movement, a cross slide mounted on said carriage for movement transversely of the tread of said tire, rack and pinion means on said cross slide and carriage for effecting said movement of the cross slide, a grooving tool holding assembly mounted on said cross slide and including a block adjustably clamped on said cross slide, a socket member reciprocably mounted in a bore in said block, screw means acting between said block and said socket member for advancing and retracting the latter toward and from said tire tread, a pivot pin rotatably mounted in said socket member, a tool holder secured to said pivot pin for rotation about an axis extending normal to said tire tread, an arm extending from said holder normal to the last mentioned axis, a link pivotally connected to said carriage, and a tie rod having one end adjustably but rigidly connected at right angles to said link and having its other end pivotally connected to said arm whereby movement of said cross slide to one side or the other of a center position with respect to a tread pattern to be cut in said tire will cause rotation of said holder in one direction or the other.

5. In a tire grooving apparatus as defined in claim 4, a second tool holding assembly adjustably mounted on said cross slide, and comprising a second block, a second socket member reciprocably mounted in said second block, second screw means acting between said block and said second socket member for advancing and retracting the latter toward and away from said tire tread, a second pivot pin rotatably mounted in said second socket, a second tool holder secured to said pivot pin for rotation about an axis extending normal to said tire tread, a second arm extending from said second holder normal to the last mentioned axis, a second link pivotally connected to said carriage and a second tie rod having one end adjustably but rigidly connected at right angles to said second link and having its other end pivotally connected to said second arm whereby said second holder is rotatated in synchronism with said first holder upon movement of said cross slide.

6. A tire grooving apparatus comprising a first frame, parallel tubular ways mounted on said first frame, carriage means slidably mounted on said tubular ways, a cutting tool carried by said carriage for movement therewith, a second frame, means for supporting a tire on said second frame with the tread portion of said tire engageable by said tool, tie rod means connected to said second frame and telescopically received within said tubular ways, and means for adjustably securing said tie rod means in said ways.

References Cited in the file of this patent

UNITED STATES PATENTS

| | | |
|---|---|---|
| 1,955,395 | Tueth | Apr. 17, 1934 |
| 2,000,129 | Dunnam | May 7, 1935 |
| 2,140,478 | Mossback | Dec. 13, 1938 |
| 2,214,885 | Matchett | Sept. 17, 1940 |
| 2,454,010 | Sauto | Nov. 16, 1948 |
| 2,570,762 | Caliri | Oct. 9, 1951 |
| 2,794,503 | Kraft | June 4, 1957 |
| 2,919,749 | Love | Jan. 5, 1960 |
| 3,003,545 | Peacock | Oct. 10, 1961 |